(12) United States Patent
Elgimiabi

(10) Patent No.: US 9,453,101 B2
(45) Date of Patent: Sep. 27, 2016

(54) VIBRATION DAMPENING COMPOSITIONS

(75) Inventor: Sohaib Elgimiabi, Neuss (DE)

(73) Assignee: 3M Innovative Properties Company, St. Paul, MN (US)

( * ) Notice: Subject to any disclaimer, the term of this patent is extended or adjusted under 35 U.S.C. 154(b) by 266 days.

(21) Appl. No.: 12/334,676

(22) Filed: Dec. 15, 2008

(65) Prior Publication Data

US 2009/0212252 A1 Aug. 27, 2009

(30) Foreign Application Priority Data

Dec. 14, 2007 (GB) .................................. 0724378.5

(51) Int. Cl.
*C08G 59/18* (2006.01)
*C08G 59/22* (2006.01)
*C08L 63/00* (2006.01)
*F16F 7/12* (2006.01)
*C09D 163/00* (2006.01)

(52) U.S. Cl.
CPC ............ *C08G 59/226* (2013.01); *C08G 59/184* (2013.01); *C08L 63/00* (2013.01); *C08L 2205/20* (2013.01); *C08L 2666/12* (2013.01); *C08L 2666/54* (2013.01); *C08L 2666/72* (2013.01); *C09D 163/00* (2013.01); *F16F 7/12* (2013.01); *F16F 2224/025* (2013.01); *F16F 2224/0233* (2013.01); *F16F 2224/0241* (2013.01)

(58) Field of Classification Search
CPC ................ C08L 63/00–63/10; C08L 2205/20; C08G 59/226; F16F 2224/0233
See application file for complete search history.

(56) References Cited

U.S. PATENT DOCUMENTS

| | | | |
|---|---|---|---|
| 5,308,895 A | 5/1994 | Gan et al. | |
| 6,130,284 A * | 10/2000 | Singh | 524/495 |
| 6,686,033 B1 * | 2/2004 | Chacko | 428/221 |
| 2007/0048504 A1 | 3/2007 | DiMario | |

FOREIGN PATENT DOCUMENTS

| | | |
|---|---|---|
| EP | 0 407 157 A2 | 1/1991 |
| EP | 0 443 812 A1 | 8/1991 |
| EP | 1 500 690 A1 | 1/2005 |
| JP | 10-278148 | 10/1998 |
| WO | WO 99/16840 | 4/1999 |
| WO | WO 02/50184 | 6/2002 |
| WO | 2007/004184 | 1/2007 |
| WO | WO 2007/069600 | 6/2007 |

OTHER PUBLICATIONS

Dualite Technical Information data sheet, Oct. 2003.*

* cited by examiner

*Primary Examiner* — Richard A Huhn

(74) *Attorney, Agent, or Firm* — Philip P. Soo; Philip Y. Dahl

(57) ABSTRACT

A curable precursor composition for preparing a vibration dampening composition having a density of less than 0.9 g/cm$^3$ said precursor composition comprising
(i) one or more rigid epoxy resin
(ii) one or more flexible epoxy resin,
(iii) a first set of hollow microspheres,
(iv) a second set of hollow microspheres wherein the microspheres of the first set are different in composition from the microspheres of the second set and,
a curing agent capable of cross-linking the rigid and flexible epoxy resins.
Also provided are vibration dampening compositions obtainable from the precursor compositions and methods of preparing such vibration dampening compositions.

7 Claims, No Drawings

VIBRATION DAMPENING COMPOSITIONS

CROSS REFERENCE TO RELATED APPLICATION

This application claims the benefit of GB 0724378.5, filed on Dec. 14, 2007, the disclosure of which is incorporated by reference in its entirety herein.

TECHNICAL FIELD

The compositions and method for making those compositions provided herein relate to vibration dampening compositions based on epoxy-resins.

BACKGROUND

Many transportation vehicles, electronic device apparatuses, and machines are subjected to noise and vibration due to the environments within which they are placed or used. Such noise and vibration can present problems in their use or function and may be annoying or harmful to the users of such devices or apparatuses. Therefore, there is a need to reduce the impact of such noise and vibration on the apparatuses, devices and users thereof. In many applications, noise and vibration is reduced by placing in or fixing to such vehicles or devices extensional dampers. Extensional dampers are usually composite pads having on one side a pressure sensitive or hot melt adhesive. These are applied to the vibrating substrate. Such plates are difficult to affix to or shape around odd shaped parts.

Thermosettable resin compositions have been used as alternatives to pads. In WO 99/16840 an epoxy resin composition has been described having good vibration dampening properties. However, according to WO 02/50184, good vibration dampening values were only observed within a very narrow temperature window. For increasing the temperature window specific filers having a high aspect ratio or a plate-like structure had to be used. For increasing the temperature window WO 02/50184 describes the use of alternative resin compositions comprising epoxy resins and a thermoplastic interpolymer.

SUMMARY

There is still a need for compositions having vibration dampening properties not only at a temperature window of greater than 30° C. but also having good mechanical resistance at a wider temperature window, e.g. from room temperature up to about 100° C. Such good mechanical properties are particularly desired when employing the vibration dampening compositions in the transportation industry, such as aircraft, motorcraft or water craft industry, where the components to which the dampening compositions have been applied may be subjected to various temperatures and/or mechanical forces.

Furthermore, in particular in the transportation industry but also in other applications, there is a continuous need for weight reduction to save energy costs. Therefore, vibration dampening compositions having a low density but yet good vibration dampening and mechanical resistance over a comparative wide temperature window are desired.

Therefore, there is a need for vibration dampening compositions that are injectable or extrudable or that can be prepared from injectable or extrudable precursor compositions having good vibration dampening properties over a comparatively wide temperature window, sufficient mechanical strength and/or resistance over temperatures greater than room temperature and that furthermore have a low density.

It has now been found that effective vibration dampening compositions of low density, preferably a density of less than 0.9 g/cm$^3$, but yet having good vibration dampening properties and mechanical resistance (e.g. Young moduli greater than 10 MPa) over a wide temperature window, preferably from room temperature up to at least about 100° C., can be prepared with compositions comprising a mixture of flexible and rigid epoxy resins, curing agents for cross-linking the epoxy resins and a combination of hollow spherical particles.

Therefore, in the following there is provided a curable precursor composition for preparing a vibration dampening composition having a density of less than 0.9 g/cm$^3$ said precursor composition comprising (i) one or more rigid epoxy resin,
(ii) one or more flexible epoxy resin,
(iii) a first set of hollow microspheres,
(iv) a second set of hollow microspheres wherein the microspheres of the first set are different in composition from the microspheres of the second set and,
a curing agent capable of cross-linking the rigid and flexible epoxy resins.

There is also provided a vibration dampening composition obtainable by curing the precursor composition described above.

Furthermore, there is provided a method of preparing a vibration dampening composition comprising
a) providing a precursor composition,
b) contacting the precursor composition with a surface,
c) curing the precursor composition.

Additionally, there is provided an article comprising a vibration dampening composition.

In yet another aspect there is provided the use of compositions for dampening vibrations of vibrating components such as for example a motor vehicle, a jet vehicle or a winnowing fan or its housing.

DETAILED DESCRIPTION

The vibration dampening properties of a polymer composition can be measured by dynamic thermal analysis (DMTA). An oscillating force is applied to a given sample at various temperatures and the resulting displacement and/or the absorption of energy by the sample is measured. By measuring the time lag in the displacement compared to the applied force it is possible to determine the dampening properties of the material. The time lag is reported as the tangent of the phase lag and expressed as 'loss factor' or 'tan delta'. The loss factor depends on the temperature. When plotting the loss factor versus temperature, the plot peaks at the glass transition temperature (Tg) of the polymer composition. Therefore, the 'loss factor peak' has been introduced, which is the loss factor at the Tg of the polymer composition. Varying the ratios of the ingredients or by adding plasticizers can influence the Tg of the composition, i.e. the composition can be fine-tuned to the temperature at which the composition achieves the highest vibration dampening. The maximum in a plot of loss factor versus temperature may be a sharp narrow peak. This means the dampening properties may be satisfactory only within a narrow temperature window. However, if good vibration dampening properties over a wide temperature range are desired, a plot of loss factor versus temperature should reveal a broad rather than a sharp peak. The "breadth" of such peak is referred to as the temperature span at loss factor peak. A loss factor of greater than 0.2 is considered to represent good vibration dampening properties. Therefore, it is desired to provide compositions having a broad temperature span around loss factor peak at which the loss factor still reaches a value of 0.2 or above. The greater the temperature span the wider is the temperature range at which the sample has a sufficient dampening performance. Preferably, the temperature span at loss factor peak at which the loss factor still reaches a value of 0.2 or above is greater than 40° C.

The glass transition temperature and thus the maximum dampening effect can be adjusted by modifying the ratio of the components, in particular the ratio of flexible to rigid epoxy resins and/or by adding other polymers, so called plasticizers. The vibration dampening composition may typically have a glass transition temperature (as determined by DMTA) of greater than about 20° C. The glass transition temperature may be less than 120° C. or less than 100° C. Typically, the glass transition temperature is within about 40 and about 90° C.

The compositions provided herein have a comparatively wide window at which they provide good vibration dampening and may therefore be suitable for vibrating substrates subjected to varying operating temperatures, e.g. from about 15 to about 150° C., or from about 20 to about 120° C.

Despite their low density, the compositions may have sufficient mechanical strength as expressed by a Young modulus of at least over 10 MPa as measured by DMTA, preferably over a temperature range of at least from about 20° C. to about 100° C.

The vibration dampening compositions are obtained by curing a precursor composition. The precursor compositions typically are extrudable or injectable. They may have an extrusion rate of at least about 30, preferably 40 g/min through a 4 mm aperture at a pressure of 5 bar. The precursor compositions, or each part of the precursor composition in case of a two-component composition, may, for example, have a Brookfield viscosity at 25° C. of between about 40 to about 700 Pa·s.

The precursor compositions are based on curable epoxy-resins. They comprise at least one rigid epoxy resin and at least one flexible epoxy resin, a combination of hollow spherical particles (microspheres) of different chemical type and a curing agent for cross-linking the epoxy-resins to form the vibration dampening composition. The flexible and rigid epoxy resins typically are two separate resins, which may be cross-linked with each other upon curing. However, it is also contemplated that the flexible and rigid epoxy resins in the precursor composition may be comprised in one resin, i.e., such resin may have flexible and rigid epoxy components.

It has been found that compositions having improved vibration dampening properties (having a loss factor peak of greater than 0.5 and a temperature span at loss factor peak at which the loss factor is at least 0.2 of at least 30° C. preferably at least 40° C.) can be prepared by curing curable (thermosettable) precursor compositions provided herewith.

It has also been found that compositions having improved vibration dampening properties (having a loss factor peak of greater than 0.5 and a temperature span at loss factor peak at which the loss factor is at least 0.2 of at least 30° C. preferably at least 40° C.) and which have a density of less than 0.9 g/cm$^3$ or less than 0.7 g/cm$^3$, preferably less than 0.6 g/cm$^3$ can be prepared by curing the curable (thermosettable) precursor compositions provided herewith.

It has further been found that compositions having improved vibration dampening properties (having a loss factor peak of greater than 0.5 and a temperature span at loss factor peak at which the loss factor is at least 0.2 of at least 30° C. preferably at least 40° C.) and which have a density of less than 0.9 g/cm$^3$ or less than 0.7 g/cm$^3$, preferably less than 0.6 g/cm$^3$ and which have a Young's modulus of at least 10 MPa at a temperature 100° C. can be prepared by curing curable (thermosettable) precursor compositions provided herewith.

The precursor composition may be a two-part composition or a one-part composition. In a two-part composition, the first part typically comprises a curing agent and the second part typically comprises the epoxy-resin, wherein the second part is separated from the first part. The ratios of first part and second part are chosen such that the molar amounts of curing agent and epoxy resins are in a range at which cross-linking of the epoxy resin occurs. Combining the two components initiates the curing process. Preferably the curing agent is capable of initiating curing at room temperature. In a one-component composition the curing is initiated by submitting the formulation to elevated temperatures, wherein the curing agent is selected such that essentially no cross-linking occurs at storage temperature, which typically is room temperature (25° C.).

Preferably, the precursor composition is a two-part composition.

The ingredients of the precursor compositions and accordingly also the vibration dampening compositions obtainable from the precursor compositions are described in greater detail below.

Epoxy Resins

Epoxy resins are polymers derived by polymerizing via the ring opening reaction of an organic compound having an oxiran ring (epoxides). Such materials include aliphatic, cycloaliphatic, aromatic or heterocyclic polymeric epoxides. Suitable materials have at least two reactive, i.e., polymerizable or cross-linkable, preferably terminal, epoxy groups per molecule. Typically, epoxy resins are prepared by polymerizing epoxy group containing monomers. Suitable monomers are typically the reaction products of an epihalohydrin with a poly hydroxy hydrocarbon yielding mono, bi- or poly glycidyl ethers.

Rigid Epoxy Resins

As used herein, rigid epoxy resins are epoxy resins comprising repeating units derived from glycidyl ethers of phenols or polynuclear phenols including their derivatives. Examples include mono-, di- or poly glycidyl ethers of p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, dihydroxydiphenylcyclohexane blends or combinations thereof. Preferred examples include glycidyl or diglycidyl ethers of bisphenol A, bisphenol F, blends or combinations thereof.

Such glycidyl ethers can be prepared, for example, by reacting the corresponding hydroxyl-functionalized arenes with an excess of epichlorohydrin.

Typical examples of rigid epoxy resins include those represented by general formula (I):

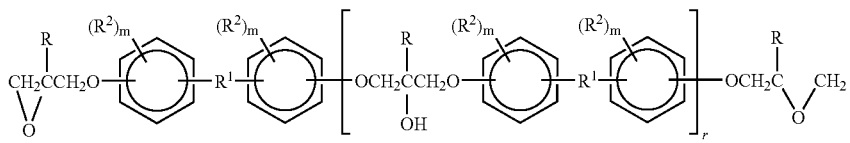

in which
R represents H, $C_1$-$C_4$ alkyl, such as methyl, ethyl, propyl, butyl, isopropyl,
$R^1$ is in each occurrence independently a $C_1$-$C_3$ alkylene (e.g. propylene, 1-methylethylene or 1,1-dimethylmethylene), a direct bond or carbonyl,
$R^2$ is in each occurrence independently H, or an alkyl, such as a $C_1$-$C_3$ alkylene,
m is separately, in each occurrence, an integer from 0 to 3
r can be 0 or an integer >0 and chosen such that the desired molecular weight of the resin can be reached.

Examples of commercially available rigid epoxy resins based on the diglycidylether of bisphenol A include those available under the tradename EPON 828, EPON 1001, EPON 1310 and EPON 1510 from Hexion Speciality Chemicals GmbH, Rosbach, Germany, and DER-331, DER-332, and DER-334 available from Dow Chemical Co. Commercial resins based on the diglycidyl ether of bisphenol F include, e.g., EPICLON 830 available from Dainippon Ink and Chemicals, Inc. Resins based on blends of bisphenol A and F are commercially available, for example, as EPIKOTE 232 from Resolution Performance Products.

The rigid epoxy resins typically have a molecular weight in the range of from about 170 to about 10,000, preferably from about 200 to about 3,000 g/mol.

The rigid epoxy resin may be a solid, a paste or a liquid at room temperature (25° C.) or may be a solid or paste dispersed in a liquid epoxy resin.

The rigid epoxy resins are typically present in the composition in an amount of from 20 to about 40% wt. based on the total weight of the precursor or vibration dampening composition.

Flexible Epoxy Resins

As used herein, flexible epoxy resins are epoxy resins comprising repeating units derived from monomers having two epoxide moieties separated from each other by at least a spacer group. The spacer group may be an alkyl, alkoxy or polyoxy alkyl chain, having at least 6 or at least 7 linear catenary atoms. The chain may be non-substituted or substituted with one or more identical or different, linear, branched or cyclic alkyl, alkyoxy or polyoxy alkyl groups. Preferably the number of substituents is less than the number of catenary atoms.

The chain is over at least parts of its length, preferably over its entire length, freely rotatable, i.e. flexible. Therefore, the epoxy resins are referred to as a "flexible" epoxy resins.

The flexible epoxy resins may be aliphatic or aromatic.

Aliphatic flexible epoxy resins comprise repeating units derived from monomers comprising at least two epoxy groups or glycidyl ether groups separated by an alkyl, alkoxy or polyoxy alkyl chain, having at least 6 or at least 7 (linear) catenary atoms. In some embodiments the spacer group may contain less than 30 or less than 20 or less than 15 linear catenary atoms. Alkoxy or polyoxy alkyl chains are preferred. Typical examples include glycidyl ethers or diglycidyl ethers of polyoxy polyols such as, from example, polyoxyalkylene glycols or alkanediols, etc.

Flexible aliphatic epoxy-resins may be generally described by formula (II):

in which
E1 and E2, independently from each other represent an epoxide or a glycidyl ether and R represents a spacer group being an alkyl, alkoxy or polyoxy alkyl chain, having at least 6 or at least 7 (linear) catenary atoms.

Preferably R is an alkoxy or polyxy alkylene such as, for example, a group comprising one or more ethyleneoxy or propyleneoxy units or combinations thereof.

Flexible aromatic epoxy resins comprise repeating units derived from monomers containing at least two aromatic glycidyl ethers or at least one aromatic glycidyl ether and a glycidyl ether group separated by a spacer group, the spacer group being an alkyl, alkoxy or polyoxy alkyl chain, having at least 6, or at least 7 (linear) catenary atoms.

The flexible aromatic epoxy resins may be generally described by formula (III):

in which
E3 and E4, independently from each other represent an epoxy group, a glycidyl ether group or an aromatic group bearing an epoxy or glycidyl ether moiety and wherein at least one of E3 and E4, preferably both, represent an aromatic group bearing an epoxy moiety, such as a glycidyl ether group.

Aromatic groups bearing epoxy moieties, such as glycidyl ether groups, include, for example, glycidyl ether phenyl groups, which may or may not be substituted, such as for example, but not limited to, glycidyl ethers of p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, dihydroxydiphenylcyclohexane or combinations thereof.

R represents a spacer group being an alkyl, alkoxy or polyoxy alkyl chain, having at least 6 or at least 7 (linear) catenary atoms.

Flexible epoxy resins may be prepared, for example, by reacting the corresponding aliphatic hydroxy compounds with an excess of epichlorohydrin, as for example, described in U.S. Pat. No. 5,308,895.

Aromatic flexible epoxy resins are commercially available, for example from Cardolite Corporation, Newark, N.J., USA, such as for example as Cardolite NC 514.

The flexible resins may typically be present in the compositions in amounts of from about 5 to about 25% wt based on the weight of the precursor or dampening composition.

Curing Agents (Hardeners)

The formulation further comprises a curing agent capable to cure (cross-link) the epoxy resins. The curing agent can be any curing agent capable of cross-linking (curing) the epoxy resins and known to one skilled in the art. Preferably, the curing agent is capable of cross-linking at room temperature or at temperatures above room temperature (25° C.). Examples include amine-terminated curing agents (primary amines) but also secondary amines. Such amines include linear or branched alkyls, polyethers, alkylamines containing primary and/or secondary amine groups and also amine-terminated polymers containing aromatic groups in their backbone. Preferably, the curing agent has a molecular weight of greater than about 150 g/mol, for example between 200 and 700 g/mol. Typically, the curing agent has a molecular weight of less than 3000 g/mol.

Anhydrides, including dianhydrides, and cyandiamides or dicyandiamides and derivatives thereof may also be used as curing agents. The choice of the curing agent may determine whether the composition is a one-part or a two-part composition and the optimal curing temperature of the composition.

For a two-component composition primary or secondary amines or anhydride curing agents are typically used. For a one-component formulation, a cyanamide or dicyanamide curing agent may be used.

Examples of suitable curing agent include those according to the general formula $$R^1R^2N-R^3-NR^4H \quad \text{(IV)}$$

in which $R^1$, $R^2$ and $R^4$ represent, independently from each other, hydrogen, a linear or branched alkyl or a linear or branched polyoxy alkyl moiety.

The residues $R^1$, $R^2$, $R^4$ may contain a hydrocarbon having about 1 to 25 carbon atoms or a polyether having from 3 to 25 carbon atoms. Preferably, one, more preferably two, and most preferably all of $R^1$, $R^2$ and $R^4$ are hydrogens.

$R^3$ represents a linear or branched alkyl, alkylamine, polyaminoakylene, polyamidoalkylene, alkylether or polyoxyalkylene group. Preferably, $R^3$ is a polyether and the curing agent is a polyetheramine or a polyetherdiamine including those polyetheramines that can be derived from polypropyleneoxide or polyethylenoxide.

$R^3$ may also be a polyamidoamine or a polyamidodiamine including those that can be derived by reacting a dimer or trimer carboxylic acid with a polyetheramine.

Suitable polyetheramines include but are not limited to those corresponding to the general formula H2N—C3H6-O—[C2H4-O-]nC3H6-NH2,     (IVa)

H2N—C3H6-O—[C3H6-O-]nC3H6-NH2,     (IVb)

H2N—C(CH3)H—CH2-[O—CH2-C(CH3)H]n-O—
    CH2-CH(CH3)-NH2     (IVc)

with n being between 1 and 34 (inclusive), such as for example 1, 2, 3, 4, 5, or between 1 and 2 (such as for example 1.5 or 1.7), between 2 and 3 (such as for example 2.5 or 2.7), between 3 and 4 (e.g. 3.5 or 3.7), between 4 and 5 (e.g. 4.5 or 4.7), or n being 31, 32, 33 or between 31 and 33.

Combinations of curing agents, for example, a combination of two or more polyetherdiamines may also be suitable.

Examples of suitable commercial curing agents include (but are not limited to) those available under the tradename PC AMINE DA from Nitroil, Germany or JEFFAMINE from Huntsman, Belgium.

Typically, the one or more curing agents may be present in an amount from about 10 to about 25% wt, based on the total amount of the precursor composition or the vibration dampening composition.

Curing Catalysts

The composition may further comprise a catalyst for the reaction of an epoxy resin with an epoxy curative compound for accelerating the curing process. Such catalysts are well known to those skilled in the art and include organic catalysts, such as ureas, imidazoles, and inorganic catalysts such as boron trihalides (for example boron triflouride) or metal salts catalysts. Metal salt catalysts are preferred. Suitable metal salt catalysts include group I metal, group II metal or lanthanoid salts wherein the anion is selected from nitrates, iodides, thiocyanates, triflates, alkoxides, perchlorates and sulfonates. Nitrates, iodides, thiocyanates, triflates and sulfonates including their hydrates being preferred and nitrates, including their hydrates, such as for example calcium nitrates, being particularly preferred.

The preferred group I metal (cation) is lithium and the preferred group II metal cations are calcium and magnesium with calcium being especially preferred. Accordingly, preferred catalyst salts are lanthane nitrate, lanthane triflate, lithium iodide, lithium nitrate, calcium nitrate and their corresponding hydrates.

The amount of catalyst used may vary depending upon the desired reactivity (curing speed) and shelf stability. Preferably the catalyst is present in an amount of 0.1 to 5 weight percent based on the weight of the vibration dampening composition or the total weight of the precursor formulation.

For most applications, the metal catalyst will be used from about 0.05 to less than 15 parts by weight based on the total weight of the total composition. Non metal catalysts may be generally used in amounts from 0.1 to 5% wt based on the total weight of the total composition.

The catalyst may be present in part A or part B or both of a two-component precursor composition.

Plasticizers

The compositions may further comprise plasticizers to modify the glass transition temperature of the formulation. Plasticizers may be used in this way to shift the loss factor peak to temperature ranges to those where maximum vibration dampening is desired. Suitable plasticizers are polymeric compounds that are compatible with the epoxy resins. Typical examples include polyester polyols, polyolefins such as ethylene propylene copolymers etc. The plasticisers typically have a viscosity of greater from about 1000 cps at 25° C. The plasticisers may have viscosity values at 25° C. of from about 1000 cps up to those values that are typical for pastes. The plasticizers may be present in an amount of from 1 to 15% wt. based on the total amount of the total composition.

Spherical Fillers

The compositions further comprise a combination of spherical or essentially spherical fillers (microspheres). Essentially spherical means the particles are not perfect spheres but may be still best described as spheres. The spherical fillers are hollow. They may be inorganic or organic. "Hollow" means the spheres are not solid. The hollow spheres may, for example, contain a vacuum, a gas or a mixture of gases or a mixture of liquids or a mixture of one or more gas and one or more liquid.

Inorganic Microspheres:

The spherical fillers may be inorganic microspheres.

The shell of such inorganic microspheres may be selected from a variety of inorganic materials such metal oxides or carbon, including by way of example glass or ceramics etc.

The inorganic microspheres preferably form free flowing powders. Preferably they have a relatively homogenous particle size. The average particle size typically is between about 1 and about 300 µm, preferably from about 5 to about 200 µm and more preferably between about 10 and about 100 µm. The inorganic microspheres preferably exhibit a density of less than about 0.5 g/cm$^3$, more preferably of between about 0.1 and about 0.45 g/cm$^3$ and especially preferably of between about 0.1 and about 0.4 g/cm$^3$.

The inorganic microspheres are preferably selected to have an advantageous crush strength so that they essentially survive the processing of the precursor including mixing and extrusion. They are preferably selected so that at least 85% and more preferably at least 90% of an amount of such microspheres included into the precursor survive the application of a pressure of at least 2,500 and more preferably of at least 4,000 psi (pounds per square inch) to the precursor.

The inorganic microspheres useful in the present invention preferably have a smooth outer surface rather than a rough outer surface.

Especially preferred hollow inorganic microspheres include glass microspheres. Hollow glass microspheres are commercially available, for example, from 3M Company, St. Paul, Minn., USA, under the trade designation SCOTCHLITE.

Organic Microspheres:

The compositions provided herein may also contain organic microspheres. The microspheres are preferably hollow, wherein "hollow" has the same meaning as described above.

The organic microspheres are polymeric microspheres. Polymeric microspheres are made of organic polymers, i.e. materials comprising repeating units derived from monomers containing at least one unsaturated carbon-carbon bond. Typical examples of suitable polymers include, but are not limited to, acrylonitrile polymers or copolymers, acrylate polymers or copolymers, vinylidene polymers or copolymers, polyacetate polymers or copolymers, polyester polymers or copolymers, vinylidenechloride/acrylonitrile copolymers, acrylate/acrylonitrile copolymers or combinations thereof.

The average diameter of the organic microspheres preferably is between 15 and 200 µm and more preferably between 20 and 180 µm. Typically, the organic microspheres have a low density, typically a density of between 0.01 and 0.3 g/cm$^3$.

Preferably, the organic microspheres are compressible. This means the volume of compressible organic microspheres is decreased when they are subjected to a pressure of, for example, 5 bar. Preferably, they are elastically compressible, i.e. they essentially return to their original shape and/or dimension when the pressure is removed.

The microspheres may be non-expanded or pre-expanded. An example for suitable organic microspheres are pre-expanded microspheres. The pre-expanded organic microspheres may comprise a polymer shell comprising, for example, acrylonitrile/acrylate copolymers or vinylidenechloride/acrylonitrile copolymers. The shell may encapsulate a core comprising, for example, but not limited to, vacuum, air, nitrogen, or one or more essentially (at room temperature) gaseous hydrocarbons.

Pre-expanded organic hollow microspheres are commercially available, for example, from Lehmann & Voss, Hamburg, Germany under the trade designation DUALITE.

The spherical fillers may be present in an amount of from about 10 percent by weight or greater, and more preferably from about 15 percent by weight or greater based on the total weight of the precursor composition or the vibration dampening composition. Preferably the spherical filler is present in an amount of from about 10 to about 35% wt. based on the total weight of the precursor composition or vibration dampening composition.

The composition comprises a combination of chemically different microspheres, preferably a combination of inorganic and organic microspheres. Typically, the composition comprise a greater amount (as determined in % wt) of inorganic than organic microspheres.

Typically, the inorganic microspheres are present in an amount of about 8 to about 30% wt and the organic microspheres may be present in an amount of from at least 1% wt or at least 2% wt and are typically comprised in an amount of from about 1 to about 10% wt based on the total amount of the total composition.

The microspheres may be of the same or different sizes. For example, a first set of microspheres may have an average particle diameter of from about 5 µm to about 105 µm and a second set of microspheres may have an average particle size of from about 90 to 200 µm.

Typically, the compositions comprise a combination of inorganic and organic microspheres. In those combinations, the organic microspheres may have a larger diameter (e.g. from about 90 to about 200 µm but not limited thereto) than the inorganic spheres (e.g. from about 5 to about 105 µm but not limited thereto).

Adjuvants

The compositions may contain one or more adjuvants. The adjuvants may be known materials used in the preparation of epoxy-containing compositions. Typical adjuvants include further fillers, i.e. non-spherical fillers, reactive diluents, adhesion promoters, pigments (inorganic or organic pigments including but not limited to ferric oxide, brick dust, carbon black, titanium oxide and the like), flame retardants, anti-oxidants etc.

Methods of Preparing the Vibration Dampening Compositions and Their Precursors

Vibration dampening compositions are prepared by curing the precursor composition. Preferably, the precursor compositions are curable at room temperature or at temperatures greater than room temperature (25° C.).

The precursor compositions contain the ingredients described above. Preferably, the precursor composition is a two-part composition containing a part A comprising the hardener (curing agent) and a separated component B comprising the flexible and rigid epoxy resin. The spherical fillers may be comprised in part A or part B or both.

The components are present in effective amounts to yield extrudable precursor compositions. In a two-part system both parts are preferably extrudable to allow dispensing and mixing in dual Pac cartridges. The extrusion rate of each part can be measured by using a 300 ml Semco cartridge (available from PPG Industries, Hamburg, Germany) through a 4 mm nozzle aperture and a pressure of 5 bar at ambient temperature (25° C.). The resulting extrusion rate is preferably above 40 g/min, more preferably at least 45 g/min.

Furthermore, the components, in particular the first and second epoxy resins, the curing agent and the spherical fillers, are present in effective amounts such that a vibration dampening composition with a loss factor peak of at least 0.4, preferably at least 0.5 results.

The loss factor peak of the vibration dampening composition is preferably at a temperature between 30 and 100° C., more preferably between 55 and 85° C.

The temperature span, at which the loss factor is greater than 0.2 is preferably at least 30° C., preferably 40° and more preferably at least 45° C.

Preferably, the vibration dampening composition has a Young Modulus at the loss factor peak of from 70 to 150 MPa.

Preferably, the ingredients and their amounts are chosen such that the vibration dampening compositions have a density of less than about 0.90, less than about 0.70 or less than about 0.60 g/cm$^3$, preferably less than about 0.50 g/cm$^3$ and more preferably less than about 0.45 g/cm$^3$.

Furthermore, the components, in particular the flexible and rigid epoxy resins, the curing agent and the spherical fillers, may be present in amounts such that the vibration dampening compositions have a Young's modulus at room temperature (25° C.) of at least about 450, preferably at least about 600 MPa and typically less than about 1500 MPa.

The amounts of the components, in particular the flexible and rigid epoxy resins, the curing agent and the spherical fillers, may be chosen such that the vibration dampening compositions have a Young's modulus at 100° C. of greater than about 10 MPa.

Loss factor, temperature span at loss factor peak and Young modulus etc. may be determined by DMTA.

In a typical embodiment of a vibration dampening composition or its precursor composition as described herein, the rigid epoxy resins are present in an amount of from about 25 to about 35% wt. based on the total weight of the composition. The flexible epoxy resins may be present in an amount less than the rigid epoxy resins. Typical amounts of flexible resins range from 9 to about 20% wt. based on the total weight of the compositions. The curing agents may be present in amounts of from about 12 to about 18% wt. based on the total weight of the compositions.

The spherical fillers may be present in amount of from about 18 to about 32% wt. based on the total weight of the composition, preferably from about 2 to 8% wt. of organic microspheres and from about 6 to 30% of inorganic microspheres. Furthermore, the composition may contain from about 3 to 10% of plasticizers.

The process of preparing the vibration dampening composition involves contacting the precursor formulation with a substrate, which typically is a vibrating substrate under operating conditions. The substrate can be any substrate for which sound damping or abatement is desired. Such substrate can be metal, wood, plastic, or fiber-reinforced plastic.

The formulation can be used in a wide variety of industries including the automotive industry, the appliance industry and construction industry. Therefore there is also provided the use of the compositions described herein in dampening of vibrations, such as for examples motor vehicles, jet engines, or fans. The formulation is particularly advantageous in that it is of low density and low viscosity such that it can be extruded or injected into irregular shaped objects such as the bodies or components of automobiles, aircraft or watercraft vehicles or the housings of engines or parts connected (directly or indirectly) to the engines or their housing, fans, such as winnowing fans and their housings including components connected to the fans and/or their housings such as for example outer guide vans of airplanes. Typical engines include combustion engines, pumps, electrical engines, jet engines, air-powered engines.

Therefore, the vibration dampening composition and its precursor composition are particularly suitable for vibration dampening in aircraft, watercraft and motor vehicles such a cars, trucks, motorcycles, trains, ships, airplanes etc.

The formulation of the invention can be contacted with the substrate by any means known in the art, for instance by coating, painting or spreading it or injecting it on the substrate. Application tools known in the art may be used for this purpose.

Once the formulation is contacted with the substrate, the formulation is allowed to cure, which may occur at room temperature or upon application of heat.

The following examples are provided to further illustrate the invention without intending to limit the invention thereto.

EXAMPLES AND METHODS

1. Dynamical Mechanical Thermal Analysis (DMTA) Measurements

DMTA measurements were taken on 5 mm×10 mm samples having a thickness of about 1.5 mm.

1.1. Sample Preparation:

The precursor composition was extruded from a 400 ml Mixpac cartridge fitted with a mixing nozzle of type MC 13-18 from MIXPAC (Mixpac Systems, AG, Rotkreuz, Switzerland). The product was then spread out to thickness of about 1.5 mm by using a lab coater.

The specimens were cured for 24 h at RT followed by 2 h 100° C. in a forced air oven. After cooling down specimen of 5 mm×10 mm were cut out from the cured samples and subjected to DMTA measurements using a DMTA V (available from Rheometric Scientific Inc., Piscataway, N.J. 08854, USA).

The DMTA V test settings for peak loss factor, Young's modulus and glass transition temperature were:
single cantilever bending mode
orientation of the drive assembly: horizontal
dynamic temperature ramp test
temperature range: −50° C./+200° C.
heating rate: 2° C./min
frequencies: 1 Hz, 10 Hz
strain: 0.05%

1.2. Measurement of the Loss Factor Peak and Glass Transition Temperature

The tan delta, the ratio of loss modulus to storage modulus (loss factor), is measured in the bending mode under the conditions as described above.

1.3. Determination of the Temperature Span at Loss Factor Peak

The temperature span was obtained by recording the tan delta versus the applied temperature, measuring the loss factor peak and measuring the temperature window around the loss factor peak at which a tan delta of 0.2 or above was still measured.

1.4. Determination of Young's Modulus

The Young's modulus (the ratio of stress- to strain-amplitude measured in the DMTA tensile or bending mode as described above) was determined at the indicated temperatures.

2. Compressive Strength

The compressive strength of the cured epoxy-based composition was measured according to ASTM D695. A 400 ml Cartridge from "Mixpac" suitable for mix ratio B/A 2/1 was filled manually to 400 ml with parts A and B in a ratio of 1:2 by volume. A mixing nozzle of type MC 13-18 from MIXPAC (Mixpac Systems, AG, Rotkreuz, Switzerland) was fitted to the cartridge. About 50 g was thus extruded into a Teflon-coated mould having the dimensions of 12.7 mm (height)×12.7 mm (width)×25 mm (length) and being open on one major side.

The mould was placed in a forced air oven and subjected to a curing program. The oven temperature was held at for 24 hours at 23° C., then the temperature was held at 100° C. for 2 hours, in order to cure the epoxy-based composition. After the curing for 2 hours at 100° C. was completed, the cured epoxy-based composition was cooled down to 23° C. over a period of 45 minutes.

The test specimens were compressed along their 25 mm axis at a constant tensometer crosshead speed of 1 mm/min by using a Zwick Model Z030 Tensile Tester (Zwick GmbH & CO., Ulm, Germany), equipped with heating capability.

The compressive strength was measured both at 23° C. (room temperature) and 100° C.

The test specimens were preconditioned in the heated equipment for at least 30 minutes before testing at 100° C.

At least three samples were measured for each epoxy composition and the results averaged and recorded in MPa.

3. Brookfield Viscosity

The viscosity can be measured using a RVF model equipped with an No 7 spindle running at 2 RPM and at 25 +/−2° C.

4. Density

The density of the cured epoxy-based compositions was measured according to ASTM D1622. Samples of the epoxy-based composition were prepared by casting the corresponding precursors into the moulds and curing in a forced air oven using the temperature program as described under the test method "Compressive Strength". The cured samples of the epoxy-based composition were removed from the moulds and their exact dimensions recorded. Each sample was weighed and the density calculated and recorded in grams per cm³.

5. Extrusion Rate

The extrusion rate was determined by measuring the quantity extruded after 60 s application of a pressure of 5 bar through a 4 mm nozzle.

A 400 ml Cartridge from "Mixpac" suitable for mix ratio B/A 2/1 was filled manually to 400 ml with parts A and B in a ratio of 1:2 by volume. A mixing nozzle of type MC 13-18 from MIXPAC (Mixpac Systems, AG, Rotkreuz, Switzerland) having was fitted to the cartridge. The product was extruded from the cartridge by using a pneumatic dispensing gun at a pressure of 5 bar for 60 seconds. Measurements were made at ambient conditions (25° C.). Each precursor was evaluated 3 times and the results were expressed in g/min averaged.

6. Materials

| | |
|---|---|
| EPIKOTE 232 | Rigid epoxy resin, a blend of bisphenol A and bisphenol F resin, available from Resolution Performance Products, Houston, TX 77002, USA |
| CARDOLITE NC 514 | Flexible epoxy resin, available from Cardolite Europe N.V, Belgium |
| CARDOLITE NC 513 | Gylcidyl ether of alkyl phenol, reactive diluent, available from Cardolite Europe N.V, Belgium |
| SCOTCHLITE D32/4500 (referred to as "glass bubbles") | Hollow glass spheres, average particle size 85 μm, available from 3M, St. Paul, Minnesota, U.S.A |
| DUALITE E065-135D (referred to as "Dualite") | pre-expanded polymer spheres made from acrylonitrile co-polymer, average particle size 130 μm, density: 0.065 g/cm³, available from Lehmann & Voss Co., Germany |
| LICOCENE PPA 330 | Ethylene-1-propene copolymer as translucent paste; plasticizer, available from Clariant, Germany |
| JEFFAMINE D230 | Polyetheramine with molecular weight of 230, curing agent, available from Huntsman Corporation, USA |
| ANCAMINE K54 | Tris-(dimethylaminomethyl) phenol, available from Air Product Chemicals Europe, Holland |
| 1-H imidazole | available from BASF, Germany |
| Calcium nitrate tetra hydrate Referred to as "calcium nitrate" | catalyst, available from Merck, Germany |
| APYRAL 24 | Aluminium hydroxide spheres, particle size ($D_{50}$ = 8 μm) available from Nabletc AG, Schwandorf, Germany. |

7. Examples 1 and 2

Preparation of a Two-Component Precursor Composition

Preparation of Part A

JEFFAMINE D230 was placed in a 2-l mechanical mixer to which EPIKOTE 232 was added in portions at room temperature and under mixing. Mixing was continued for 60 min at RT. The mixture was then heated to 80° C. and kept at this temperature for further 60 min. Calcium nitrate and imidazole were added and mixed until both materials were completely dissolved. The mixture was then cooled down to RT followed by addition of ANCAMINE K54. To the homogeneous mixture the glass bubbles were added and mixed for about 30 min. Then the DUALITE microspheres were added and mixed for 15 min yielding a homogeneous white paste. The ingredients were used in the amounts shown in table 1.

Preparation of Part B

The base resin (part B) of the present invention was prepared by combining the ingredients listed in table 2 in a 2 litre mechanical mixer. A temperature of less than 35° C. was maintained during the mixing process, using water cooling. The epoxy resins EPIKOTE 232, CARDOLITE NC 514 and CARDOLITE NC 513 were mixed with ethylene propene copolymer (plasticizer) for about 30 minutes. After achieving a homogeneous mixture the glass microspheres were added and mixed for 15 min. In a final step the polymeric microspheres were added to the mixture and mixed until homogeneity. These mixtures were pastes having a smooth and uniform consistency. The ingredients were used in the amounts as shown in table 2 (B1 and B2).

Preparation of the Vibration Dampening Composition (A+B)

Parts A and B were combined in a ratio of A:B of 1:2 v/v using a 400 ml Cartridge, suitable for mix ratio B/A 2/1, from "Mixpac" A mixing nozzle of type MC 13-18 from MIXPAC (Mixpac Systems, AG, Rotkreuz, Switzerland) was fitted to the cartridge.

The precursor compositions were extruded (extrusion rate was 40 g/min) onto a carrier (a PTFE slide) and were then spread out to a thickness of about 1.5 mm by using a lab coater. The specimens were cured for 24 h RT followed by 2 h 100° C. in an oven. After cooling down to RT the specimens were subjected to the DMTA testing procedure described above. The results are shown in table 3 (Ex 1).

8. Comparative Example 1 (C1)

Part A, part B and the cured composition of A+B were prepared as described above for example 1 with the exception that the glass bubbles or polymeric microspheres were replaced with spherical aluminium hydroxide (APYRAL 24).

The composition of parts A and B is shown in tables 1 (A2) and 2 (B3) and the mechanical properties of the cured composition is shown in table 3 (C1).

TABLE 1

Composition of part A

| | A1 (% wt.) | A2 (% wt.) |
|---|---|---|
| JEFFAMINE D230 | 44 | 44 |
| EPIKOTE 232 | 11 | 11 |
| ANCAMINE K54 | 12 | 12 |
| Calcium nitrate | 6 | 6 |
| 1H-imidazole | 1 | 1 |
| "Glass bubbles" | 22 | |
| "Dualite" | 4 | |
| APYRAL 24 | | 26 |
| Total | 100 | 100 |

TABLE 2

Composition of part B

| | B1 (% wt.) | B2 (% wt.) | B3 (wt. %) |
|---|---|---|---|
| EPIKOTE 232 | 42 | 42 | 42 |
| CARDOLITE NC 514 | 20 | 20 | 20 |
| CARDOLITE NC 513 | 6 | 6 | 6 |
| Glass bubbles | 20 | 22 | |
| Ethylene propylene copolymer | 8 | 8 | 8 |
| Dualite | 4 | 2 | |
| APYRAL 24 | | | 24 |
| Total | 100 | 100 | 100 |

TABLE 3

Mechanical properties of the cured compositions

| | Ex 1 | Ex 2 | C1 |
|---|---|---|---|
| Composition | A1 + B1 | A1 + B2 | A2 + B3 |
| loss factor peak | >0.45 | >0.45 | >0.45 |
| Tg (° C.) | 69 | 80 | 75 |
| Young's Modulus at 25° C. (MPa) | >900 | >900 | >900 |
| Young's Modulus at 100° C. (MPa) | 14 | 26 | 7 |
| Young's Modulus at peak loss factor (MPa) | 75 | 88 | 48 |
| Temperature span with a loss factor of greater 0.2 (° C.) | 46 | 40 | <40 |
| Density (g/cm$^3$) | 0.5 | 0.6 | 1.1 |
| Compressive strength at 25° C. (MPa) | 15 | | |

TABLE 4

Composition in wt. % of Ex 1 above

| Raw material | Parts | weight % |
|---|---|---|
| EPIKOTE 232 | 94.88 | 31.63 |
| CARDOLITE NC 514 | 40 | 13.33 |
| CARDOLITE NC 513 | 12 | 4.00 |
| "Glass bubbles" | 61.95 | 20.65 |
| Ethylene propene copolymer | 16 | 5.33 |
| "Dualite" | 12 | 4.00 |
| JEFFAMINE D230 | 44.33 | 14.78 |
| ANCAMINE K54 | 11.8 | 3.93 |
| Calcium nitrate | 6.04 | 2.01 |
| 1H-imidazole | 1 | 0.33 |
| Total | 300 | 100.10 |

What is claimed is:

1. A curable two-part precursor composition comprising:
   I) part A comprising:
      (i) a curing agent that is capable of cross-linking the rigid epoxy resin and the flexible epoxy resin of part B, and
   II) part B comprising:
      (i) one or more rigid epoxy resin,
      (ii) one or more flexible epoxy resin,
      (iii) a first set of hollow microspheres which are compressible pre-expanded organic microspheres and have an average diameter of from about 90 µm to 200 µm, and
      (iv) a second set of hollow microspheres which are inorganic microspheres;
   wherein curing of the composition is initiated by the combination of the two parts and wherein the composition cures to form a vibration dampening composition having a density of less than 0.9 g/cm$^3$.

2. The curable two-part precursor composition according to claim 1, wherein the flexible epoxy resin is an aromatic resin.

3. The curable two-part precursor composition according to claim 1, wherein the microspheres of the second set have an average particle diameter of from about 5 µm to about 105 µm.

4. The curable two-part precursor composition according to claim 1, wherein the microspheres of the first set are present in an amount of from about 2 to 8 wt % of the total weight of the composition.

5. The curable two-part precursor composition according to claim 1, wherein the microspheres of the second set are present in an amount of from about 18 to about 32 wt % of the total weight of the composition.

6. The curable two-part precursor composition according to claim 1, wherein the rigid epoxy resin is derived from epoxy-functionalized bisphenol A, bisphenol F, or a combination thereof.

7. The curable two-part precursor composition according to claim 1, wherein the composition is injectable through a 4 mm nozzle at ambient conditions and at a pressure of 5 bar.

* * * * *

UNITED STATES PATENT AND TRADEMARK OFFICE
CERTIFICATE OF CORRECTION

| | | |
|---|---|---|
| PATENT NO. | : 9,453,101 B2 | Page 1 of 1 |
| APPLICATION NO. | : 12/334676 | |
| DATED | : September 27, 2016 | |
| INVENTOR(S) | : Sohaib Elgimiabi | |

It is certified that error appears in the above-identified patent and that said Letters Patent is hereby corrected as shown below:

In the Specification

Column 3
Lines 31-39, delete "The vibration dampening compositions are obtained by curing a precursor composition. The precursor compositions typically are extrudable or injectable. They may have an extrusion rate of at least about 30, preferably 40 g/min through a 4 mm aperture at a pressure of 5 bar. The precursor compositions, or each part of the precursor composition in case of a two-component composition, may, for example, have a Brookfield viscosity at 25.degree. C. of between about 40 to about 700 Pas." and insert the same on Column 3, Line 33, as a new paragraph.

Column 13
Line 55, delete "No 7" and insert -- N° 7 --, therefor.

Column 16
Line 33, delete "100.10" and insert -- 100 --, therefor.

Signed and Sealed this
Fourteenth Day of March, 2017

Michelle K. Lee
*Director of the United States Patent and Trademark Office*